(12) United States Patent
Silich

(10) Patent No.: US 8,874,529 B2
(45) Date of Patent: Oct. 28, 2014

(54) USER-DETERMINABLE METHOD AND SYSTEM FOR MANIPULATING AND DISPLAYING TEXTUAL AND GRAPHICAL INFORMATION

(76) Inventor: Bert A. Silich, Harrison Township, MI (US)

(*) Notice: Subject to any disclaimer, the term of this patent is extended or adjusted under 35 U.S.C. 154(b) by 1063 days.

(21) Appl. No.: 12/381,704

(22) Filed: Mar. 16, 2009

(65) Prior Publication Data

US 2010/0235331 A1    Sep. 16, 2010

(51) Int. Cl.
*G06F 17/30* (2006.01)
*G06F 17/24* (2006.01)

(52) U.S. Cl.
CPC ........ *G06F 17/30716* (2013.01); *G06F 17/241* (2013.01)
USPC ........................................ 707/692; 707/693

(58) Field of Classification Search
USPC .................................................. 707/692, 693
See application file for complete search history.

(56) References Cited

U.S. PATENT DOCUMENTS

| | | | | |
|---|---|---|---|---|
| 4,965,763 A * | 10/1990 | Zamora | ............................. | 704/1 |
| 5,077,668 A * | 12/1991 | Doi | ............................. | 715/206 |
| 5,297,027 A * | 3/1994 | Morimoto et al. | ............ | 715/254 |
| 5,384,703 A * | 1/1995 | Withgott et al. | ............. | 715/236 |
| 5,638,543 A * | 6/1997 | Pedersen et al. | .................. | 704/1 |
| 5,666,552 A * | 9/1997 | Greyson et al. | ............... | 715/210 |
| 5,689,716 A * | 11/1997 | Chen | ............................ | 715/256 |
| 5,778,397 A * | 7/1998 | Kupiec et al. | ................. | 715/243 |
| 5,838,323 A * | 11/1998 | Rose et al. | .................... | 715/236 |
| 5,848,191 A * | 12/1998 | Chen et al. | .................... | 382/229 |
| 5,907,841 A * | 5/1999 | Sumita et al. | .......... | 707/999.004 |
| 5,920,877 A * | 7/1999 | Kolster | .......................... | 715/235 |
| 5,924,108 A * | 7/1999 | Fein et al. | ..................... | 715/267 |
| 6,098,034 A * | 8/2000 | Razin et al. | ...................... | 704/9 |
| 6,205,456 B1 * | 3/2001 | Nakao | ........................... | 715/201 |
| 6,295,529 B1 * | 9/2001 | Corston-Oliver et al. | .... | 707/715 |
| 6,353,824 B1 * | 3/2002 | Boguraev et al. | ............. | 715/277 |
| 6,470,307 B1 * | 10/2002 | Turney | ............................. | 704/9 |
| 6,553,373 B2 * | 4/2003 | Boguraev et al. | ...... | 707/999.001 |
| 6,581,057 B1 * | 6/2003 | Witbrock et al. | ...... | 707/999.005 |
| 6,865,572 B2 * | 3/2005 | Boguraev et al. | ...... | 707/999.001 |
| 6,970,602 B1 * | 11/2005 | Smith et al. | ................... | 382/232 |
| 7,124,372 B2 * | 10/2006 | Brin | ............................. | 715/751 |
| 7,162,413 B1 * | 1/2007 | Johnson et al. | ................... | 704/9 |
| 7,366,711 B1 * | 4/2008 | McKeown et al. | ..... | 707/999.003 |
| 7,433,832 B1 | 10/2008 | Bezos | | |
| RE41,152 E * | 2/2010 | Reynar et al. | ................. | 708/203 |
| 7,743,317 B2 * | 6/2010 | Broman et al. | ............... | 715/217 |

(Continued)

OTHER PUBLICATIONS

J. Trachtenberg, et al., Better Scratch Kindle Off Your List, Dec. 4, 2008.

(Continued)

*Primary Examiner* — Debbie Le
(74) *Attorney, Agent, or Firm* — Brooks Kushman P.C.

(57) ABSTRACT

One or more aspects of the invention include transforming source data in order to display a work product. A plurality of rules relating to content manipulation of the source data include at least one rule relating to content selection and at least one rule relating to content compression. Source data for content manipulation may also be received. A selected portion of the source data and a compressed portion of the source data may be formed. The compressed portion may then be received and presented on a computer a work product.

13 Claims, 30 Drawing Sheets
(27 of 30 Drawing Sheet(s) Filed in Color)

(56) References Cited

U.S. PATENT DOCUMENTS

| | | | |
|---|---|---|---|
| 2002/0062325 A1* | 5/2002 | Berger et al. | 707/518 |
| 2007/0026371 A1* | 2/2007 | Wood | 434/317 |
| 2008/0043834 A1* | 2/2008 | Lesser et al. | 375/240 |
| 2008/0207182 A1* | 8/2008 | Maharajh et al. | 455/414.1 |
| 2010/0278453 A1* | 11/2010 | King | 382/321 |

OTHER PUBLICATIONS

Website: www.amazon.com, Customer reviews of Kindle, (page printed Oct. 29, 2008).

* cited by examiner

Figure 3

1 Declaration of Independence ["D of I"]

THE DECLARATION OF INDEPENDENCE

IN CONGRESS, July 4, 1776
The unanimous declaration of the thirteen united States of America.

When in the Course of human events, it becomes necessary for one people to dissolve the political bonds which have connected them with another, and to assume among the powers of the earth, the separate and equal station to which the Laws of Nature and of Nature's GOD entitle them, a decent respect to the opinions of mankind requires that they should declare the causes which impel them to the separation.
    We hold these truths to be self-evident, that all men are created equal, that they are endowed by their Creator with certain unalienable Rights, that among these are Life, Liberty and the pursuit of Happiness. – That to secure these rights, Governments are instituted among Men, deriving their just powers from the consent of the governed. – That whenever any Form of Government becomes destructive of these ends it is the Right of the People to alter or to abolish it, and to institute new Government, laying its foundation on such principles and organizing its powers in such form, as to them shall seem most likely to effect their Safety and Happiness.

*[The paragraphs are separated for demonstration only. Comments will be placed here. The paragraphs above demonstrate the concept primarily. In some cases, paragraphs below also demonstrate variations of the concept]*

Figure 4

2.0 D of I Primary

THE DECLARATION OF INDEPENDENCE

IN CONGRESS, July 4, 1776
The unanimous declaration of the thirteen united States of America.

When in the Course of human events, it becomes necessary for one people to dissolve the political bonds which have connected them with another, and to assume among the powers of the earth, the separate and equal station to which the Laws of Nature and of Nature's GOD entitle them, a decent respect to the opinions of mankind requires that they should declare the causes which impel them to the separation.
We hold these truths to be self-evident, that all men are created equal, that they are endowed by their Creator with certain unalienable Rights, that among these are Life, Liberty and the pursuit of Happiness. -- That to secure these rights, Governments are instituted among Men, deriving their just powers from the consent of the governed. -- That whenever any Form of Government becomes destructive of these ends it is the Right
of the People to alter or to abolish it, and to institute new Government, laying its foundation on such principles and organizing its powers in such form, as to them shall seem most likely to effect their Safety and Happiness.

[Various options for marking primary information blocks.]

- Yellow / 
- Bold / *Italic*
- Red / Green

Figure 5

2.1 D of I Primary Only

DECLARATION OF INDEPENDENCE

Course of human events,                                          dissolve
the political bonds
                    separate and equal station
Nature's GOD entitle them,
      declare the causes which impel them to the separation.
                truths to be self-evident,     all men are created equal,
                          unalienable Rights,                  Life, Liberty
    pursuit of Happiness.
                  powers from the consent of the governed.
    Government becomes destructive              Right
of the People to alter or to abolish it.    institute new Government, to effect their Safety and Happiness.

[ No position change with primary highlighted text only; surplusage removed ]

Figure 6

2.2 D of I Primary Compressed

DECLARATION OF INDEPENDENCE

```
                    Course of human events,
dissolve the political bonds
                            separate and equal station
Nature's GOD entitle them,
        declare the causes which impel them to the separation.
                    truths to be self-evident,    all men are created equal,
                                        unalienable Rights,    Life,
Liberty    pursuit of Happiness.
                                    powers from the consent of the governed.
                    Government becomes destructive    Right
of the People to alter or to abolish it,    institute new Government.

to effect their Safety and Happiness.
```

[Maintain line integrity,
maintain position of the closest block to the left margin,
compress the blocks on each line leftward to the lesser of the original space or 5 spaces
(variable and set by user).]

Figure 7

2.3 D of I Primary Compressed

DECLARATION OF INDEPENDENCE

Course of human events,
dissolve the political bonds
separate and equal station
Nature's GOD entitle them,
declare the causes which impel them to the separation.
    truths to be self-evident,    all men are created equal,
unalienable Rights,    Life,
Liberty    pursuit of Happiness.
powers from the consent of the governed.
Government becomes destructive    Right
of the People to alter or to abolish it,    institute new Government, to effect their Safety and Happiness.

[Slide each line to first space of the left margin , continue to maintain indent margin of first line of paragraph. Maintain line integrity. Maintain space between blocks as set by the user]

Figure 8

2.4 D of I Primary Paragraph

DECLARATION OF INDEPENDENCE

Course of human events, dissolve the political bonds separate and equal station Nature's GOD entitle them. declare the causes which impel them to the separation. truths to be self-evident, all men are created equal, unalienable Rights, Life,Liberty pursuit of Happiness. powers from the consent of the governed. Government becomes destructive Right of the People to alter or to abolish it, institute new Government. to effect their Safety and Happiness.

[Compress entire paragraph disregarding line integrity,
except continue to maintain paragraph integrity.]

Figure 9

2.5 D of I Primary Outline

DECLARATION OF INDEPENDENCE

Course of human events,
dissolve the political bonds
separate and equal station
Nature's GOD entitle them,
declare the causes which impel them to the separation.
truths to be self-evident,
all men are created equal.
unalienable Rights,
Life, Liberty
pursuit of Happiness.
powers from the consent of the governed.
Government becomes destructive
Right of the People to alter or to abolish it,
institute new Government,
to effect their Safety and Happiness.

[Primary text all left margined with each block on a separate line, except Paragraph margin is maintained.]

Figure 10

2.6 D of I Primary Only & Punctuation

DECLARATION OF INDEPENDENCE

Course of human events,                                        dissolve
the political bonds
        ,        separate and equal station      .
Nature's GOD entitle them,
      declare the causes which impel them to the separation.
              truths to be self-evident,     all men are created equal,
                           unalienable Rights,                Life, Liberty
     pursuit of Happiness.             ,
                         powers from the consent of the governed.
   ,      Government becomes destructive          Right
of the People to alter or to abolish it,    institute new Government,
                                     ,
to effect their Safety and Happiness.

[ No position change with primary highlight only (similar to #2.1) except ALL punctuation remains in place ]

Figure 11

2.7 D of I Primary Compressed & Punctuation

DECLARATION OF INDEPENDENCE
,         ,
                                                           .

Course of human events,
dissolve the political bonds      ,
                              ,         separate and equal station
        Nature's GOD entitle them,
            declare the causes which impel them to the separation.
                    truths to be self-evident,      all men are created equal,
                                            unalienable Rights.      Life,
Liberty       pursuit of Happiness.    ,
                                    powers from the consent of the governed.
                    Government becomes destructive      Right
of the People to alter or to abolish it.      institute new Government,
                                                                    ,
            to effect their Safety and Happiness.

[ Left block margin maintained, other blocks compressed with primary highlight only similar to #2.2 except ALL punctuation remains and they are treated like a block of words ]

Figure 12

2.8 D of I Primary Compressed & Punctuation

DECLARATION OF INDEPENDENCE

, ,
.

Course of human events,
dissolve the political bonds   ,
, separate and equal station
Nature's GOD entitle them.
declare the causes which impel them to the separation.
     truths to be self-evident.    all men are created equal.
unalienable Rights,   Life,
Liberty    pursuit of Happiness.  ,
,   powers from the consent of the governed.
Government becomes destructive   Right
of the People to alter or to abolish it.   institute new Government.

,
to effect their Safety and Happiness.

[All blocks compressed to left similar to #2.3 except ALL punctuation remains and they are treated like a block of words]

Figure 13

2.9 D of I Primary Paragraph & Punctuation

DECLARATION OF INDEPENDENCE
,  ,  .

Course of human events,    dissolve the political bonds  ,  ,    separate and equal station    Nature's GOD entitle them,    declare the causes which impel them to the separation.
    truths to be self-evident,    all men are created equal,    unalienable Rights, Life,Liberty    pursuit of Happiness.  ,  ,    powers from the consent of the governed. Government becomes destructive    Right of the People to alter or to abolish it,    institute new Government,    .    to effect their Safety and Happiness.

[Compressed with primary highlight only similar to #2.4 except ALL punctuation remains and they are treated like a block of words.]

Figure 14

2.10 D of I Primary Outline & Punctuation

DECLARATION OF INDEPENDENCE , , .

Course of human events,
dissolve the political bonds   , ,
separate and equal station
Nature's GOD entitle them,
declare the causes which impel them to the separation.
    truths to be self-evident,
all men are created equal.
unalienable Rights,
Life, Liberty
pursuit of Happiness.   , ,
powers from the consent of the governed.
Government becomes destructive
Right of the People to alter or to abolish it,
institute new Government,   ,
to effect their Safety and Happiness.

[Primary text all left margined with each block on a separate line.
    Paragraph margin is maintained. ALL punctuation remains but punctuation
    alone does not get its own separate line ]

Figure 15

3.0 D of I Highlighted - Primary and Secondary Levels

THE DECLARATION OF INDEPENDENCE

IN ▓▓▓▓▓▓▓▓▓▓▓▓▓▓▓▓
The unanimous declaration of the ▓▓▓▓▓▓▓▓▓▓▓▓▓▓▓▓▓▓▓▓

When in the Course of human events, it becomes necessary for one people to dissolve the political bonds which have connected them with another, and to assume among the powers of the earth, the separate and equal station ▓▓▓▓▓▓▓▓▓▓▓▓▓▓▓▓ and of Nature's GOD entitle them, a decent respect to the opinions of mankind requires that they should declare the causes which impel them to the separation.
We hold these truths to be self-evident, that all men are created equal, that they are ▓▓▓▓▓▓▓▓▓▓▓▓▓▓▓▓ with certain unalienable Rights, that among these are Life, Liberty and the pursuit of Happiness. -- That to secure these rights, ▓▓▓▓▓▓▓▓▓▓▓▓▓▓▓▓▓▓▓▓ ▓▓▓ deriving their just powers from the consent of the governed. -- That whenever any Form of Government becomes destructive of these ends it is the Right of the People to alter or to abolish it, and to institute new Government, laying its foundation on such principles and organizing its powers in such form, as to them shall seem most likely to effect their Safety and Happiness.

[Various options for marking primary and secondary information blocks.]

- Yellow / ▓▓▓▓▓
- Bold / *Italic*
- Red / Green

Figure 16

3.1 D of I Highlighted Only

DECLARATION OF INDEPENDENCE

▓▓▓▓▓▓▓▓▓▓▓▓▓▓▓     ▓▓▓▓▓▓▓▓▓▓▓▓▓▓▓▓▓▓▓▓▓

Course of human events,                                      dissolve
the political bonds
                          separate and equal station ▓▓▓▓▓▓▓▓▓▓▓▓▓▓▓▓▓▓▓
Nature's GOD entitle them,
        declare the causes which impel them to the separation.
                    truths to be self-evident,     all men are created equal.
▓▓▓▓▓▓▓▓▓▓▓▓▓▓▓▓▓            unalienable Rights,               Life, Liberty
       pursuit of Happiness.                      ▓▓▓▓▓▓▓▓▓▓▓▓▓▓▓▓▓▓▓
▓▓▓            powers from the consent of the governed.
   Government becomes destructive          Right
of the People to alter or to abolish it,     institute new Government, to effect their Safety and Happiness.

[Primary and secondary print only. No changes in position]

Figure 17

3.2 D of 1 Highlighted Compressed

DECLARATION OF INDEPENDENCE

▇▇▇▇▇▇▇▇▇▇▇▇▇▇  ▇▇▇▇▇▇▇▇▇▇▇▇▇▇▇▇▇▇▇▇▇▇

Course of human events,               dissolve
the political bonds
      separate and equal station ▇▇▇▇▇▇▇▇▇▇▇▇ Nature's
GOD entitle them,
declare the causes which impel them to the separation.
      truths to be self-evident,   all men are created equal,
▇▇▇▇▇▇▇▇▇▇▇▇ unalienable Rights,  Life,
Liberty   pursuit of Happiness.  ▇▇▇▇▇▇▇▇▇
▇▇▇▇▇▇▇▇▇▇ powers from the consent of the governed.
      Government becomes destructive  Right
of the People to alter or to abolish it.  institute new Government, to effect their Safety and Happiness.

[Maintain line integrity,
maintain position of the closest block to the left margin,
compress the blocks on each line leftward to the lesser of the original space or 5 spaces
(variable and set by user).]

Figure 18

3.3 D of 1 Highlighted Compressed

DECLARATION OF INDEPENDENCE

▓▓▓▓▓▓▓▓▓▓▓▓▓▓▓▓

Course of human events,
dissolve the political bonds
separate and equal station ▓▓▓▓▓▓▓▓
▓▓▓▓ Nature's GOD entitle them,
declare the causes which impel them to the separation.
    truths to be self-evident, all men are created equal.
▓▓▓▓▓▓▓▓▓▓▓▓ unalienable Rights, Life,
Liberty pursuit of Happiness. ▓▓▓▓▓▓▓▓
▓▓▓▓▓▓▓▓▓▓ powers from the consent of the governed.
Government becomes destructive Right
of the People to alter or to abolish it, institute new Government,
effect their Safety and Happiness.

[Slide each line to first space of the left margin , continue to maintain indent margin of first line of paragraph. Maintain line integrity. Maintain space between blocks as set by the user]

Figure 19

3.4 D of I Highlighed Paragraph

DECLARATION OF INDEPENDENCE

▓▓▓▓▓▓▓▓▓▓▓▓▓▓▓▓

Course of human events,   dissolve the political bonds      separate and equal station
▓▓▓▓▓▓▓▓▓▓▓▓▓▓      Nature's GOD entitle them.    declare the causes which
impel them to the separation.
    truths to be self-evident.    all men are created equal, ▓▓▓▓▓▓▓▓▓▓▓▓
unalienable Rights,   Life, Liberty    pursuit of Happiness. ▓▓▓▓▓▓▓▓▓▓▓▓
▓▓▓▓▓▓▓▓▓▓▓▓    powers from the consent of the governed.   Government
becomes destructive    Right of the People to alter or to abolish it,    institute new
Government,    to effect their Safety and Happiness.

[Compress entire paragraph disregarding line integrity,
        except continue to maintain paragraph integrity.]

Figure 20

3.5 D of 1 Highlighted Outline

DECLARATION OF INDEPENDENCE

▓▓▓▓▓▓▓▓▓▓▓▓

Course of human events,
dissolve the political bonds
separate and equal station
▓▓▓▓▓▓▓▓▓▓▓▓
Nature's GOD entitle them,
declare the causes which impel them to the separation.
  truths to be self-evident,
all men are created equal,
▓▓▓▓▓▓▓▓▓▓▓▓
unalienable Rights,
Life, Liberty
pursuit of Happiness.
▓▓▓▓▓▓▓▓▓▓▓▓
powers from the consent of the governed.
Government becomes destructive
Right of the People to alter or to abolish it,
institute new Government,
 to effect their Safety and Happiness.

[Primary and Secondary text all left margined with each block on a separate line,
        except Paragraph margin is maintained.]

Figure 21

3.6 D of 1 Highlighted

DECLARATION OF INDEPENDENCE

████████████████

Course of human events,   dissolve the political bonds   ,   ,   separate and equal station ████████████████ Nature's GOD entitle them,   declare the causes which impel them to the separation.
truths to be self-evident,   all men are created equal,   ████████████████ unalienable Rights,   Life, Liberty   pursuit of Happiness.   --   ,   ████████████████ powers from the consent of the governed.   --   Government becomes destructive   Right of the People to alter or to abolish it,   institute new Government,   ,   to effect their Safety and Happiness.

[Compress entire paragraph disregarding line integrity, except continue to maintain paragraph integrity. Show ALL punctuation treat each punctuation like a block.]

Figure 22

4.0 D of I Secondary

THE DECLARATION OF INDEPENDENCE

IN ▓▓▓▓▓▓▓▓▓▓▓▓
The unanimous declaration of the ▓▓▓▓▓▓▓▓▓▓▓▓▓▓▓▓

When in the Course of human events, it becomes necessary for one people to dissolve the political bonds which have connected them with another, and to assume among the powers of the earth, the separate and equal station ▓▓▓▓▓▓▓▓▓▓ and of Nature's GOD entitle them, a decent respect to the opinions of mankind requires that they should declare the causes which impel them to the separation.
    We hold these truths to be self-evident, that all men are created equal, that they are ▓▓▓▓▓▓▓▓▓▓▓▓ with certain unalienable Rights, that among these are Life, Liberty and the pursuit of Happiness. – That to secure these rights, ▓▓▓▓▓▓▓▓▓▓▓▓▓▓ ▓▓▓ deriving their just powers from the consent of the governed. – That whenever any Form of Government becomes destructive of these ends it is the Right
of the People to alter or to abolish it, and to institute new Government, laying its foundation on such principles and organizing its powers in such form, as to them shall seem most likely to effect their Safety and Happiness.

[Various options for marking secondary information blocks.]

- Yellow / ▓▓▓▓
- Bold / *Italic*
- Red / Green

4.1 D of 1 Secondary Only

[Secondary highlight only, no position change]

4.2 D of I Secondary Compressed

[Maintain line integrity, maintain position of the closest block to the left margin, compress the blocks on each line leftward to the lesser of the original space or 5 spaces (variable and set by user).]

4.3 D of I Secondary Compressed

[Slide each line to first space of the left margin , continue to maintain indent margin of first line of paragraph.  Maintain line integrity.  Maintain space between blocks as set by the user]

4.4 D of I Secondary Paragraph

[Compress entire paragraph disregarding line integrity, except continue to maintain paragraph integrity.]

4.5 D of I Secondary Outline

[Secondary text all left margined with each block on a separate line, except Paragraph margin is maintained of the first block in the paragraph.]

USER-DETERMINABLE METHOD AND SYSTEM FOR MANIPULATING AND DISPLAYING TEXTUAL AND GRAPHICAL INFORMATION

BACKGROUND

1. Technical Field

Two aspects of the invention are a user-determinable method and system for displaying external and graphical indicia (collectively "text") on a display device in a compressed form. This allows the user or the author to display text that he/she deems important for emphasis and hide less important information. Yet all information is continuously available for retrieval when needed.

2. Background Art

Computers have untapped capabilities for reading and data management. When learning by reading, we first read the book. As we read or study, we may highlight various blocks of text that we wish to remember. Then, on review (particularly when studying or referencing source material), one may elect to condense the highlighted information. At first, the outline may have large amounts of information. But, as we repeatedly go through the text and become more familiar with the material, we are able to reduce the amount of data that we desire to review. When we revisit our outline or notes, this is often enough to jog our memory on the details of the text. If we cannot recall those details of the text, we then go back to our more extensive outlines or to the original book of information.

The prior art includes such devices as the AMAZON KINDLE handheld E book reader. This and similar devices enable a user to read electronic books, rather than traditional print versions.

SUMMARY

While such devices enable the user to read from a screen, it would be desirable if the user prefers to allow a combination of text highlighting, annotation and data compression which would enable surplusage to be removed from the displayed image.

One aspect includes a system for transforming textual and graphical source data in order to display a work product. The system may comprise at least one computer configured to receive a plurality of rules relating to content manipulation of source data including at least one rule relating to content selection and at least one rule relating to content compression. In one embodiment, the plurality of rules relating to content manipulation may include at least two rules relating to content selection, a first rule for selecting primary content and a second rule for selecting secondary content. The selected primary content may have greater significance to the user than the selected secondary content. Furthermore, the work product may be displayed such that the primary content has greater significance than the selected secondary content.

The at least one computer may be further configured to receive source data for content manipulation. At least a portion of the source data may be selected according to at least one rule relating to content selection to form a selected portion. The selected portion may then be compressed according to at least one rule relating to content compression to form a compressed portion. In one embodiment, the at least one rule relating to content compression may include at least one rule relating to the integrity, position, or compression format of the source data. The at least one computer may be further configured to receive the compressed portion based on at least two of the rules relating to integrity, position, or compression format.

Optionally, the at least one computer may be further configured to receive the compressed portion and present the compressed portion on the computer as a work product for a user. The work product may presented on at least one device selected from the group consisting of personal digital assistants (PDAs), smartphones, cellphones, mobile devices, personal media players, and e-book readers. Furthermore, in some embodiments, the work product may be presented aurally, visually, or both.

In further embodiments, the at least one computer is further configured to receive a plurality of customization rules relating to customizing the display of the work product and customize the work product according to one or more of the plurality of customization rules.

In further embodiments, the system may further comprise a database in communication with the at least one computer for retrieving reference information from the database for inclusion in the work product.

Another aspect may include a computer program product tangibly embodied in a computer readable medium comprising instructions for transforming textual and graphical source data in order to display a work product. The computer program product may include instructions for receiving a plurality of rules relating to content manipulation of source data including at least one rule relating to content selection and at least one rule relating to content compression. In some embodiments, the plurality of rules relating to content manipulation of source data may further include at least two rules relating to content selection, a first rule for selecting primary content and a second rule for selecting secondary content. The selected primary content may have greater significance to the user than the selected secondary content and the computer program product may further include instructions for displaying the work product such that the primary content has greater significance than the selected secondary content.

The computer program product may further include instructions for receiving source data for content manipulation. At least a portion of the source data may be selected according to at least one rule relating to content selection to form a selected portion. In some embodiments, the selected portion may be blocked by highlighting, boldfacing, underlining, italicizing, or any combination thereof.

The selected portion may then be compressed according to at least one rule relating to content compression to form a compressed portion. In some embodiments, the compressed portion may have less content than the source data received for content manipulation. In some further embodiments, the at least one rule relating to content compression may include at least one rule relating to the integrity, position, or compression format of the source data and the computer program product may further include instructions for receiving the compressed portion based on at least two of the rules relating to integrity, position, or compression format. In yet further embodiments, the at least one rule relating to content compression may include one or more rules relating to only removing content of the source data that is not selected. In some further embodiments, the at least one rule relating to content compression may include one or more rules relating to removing only the selected portion of the source data.

The computer program product may further include instructions for receiving the compressed portion. The computer program product may further include instructions for presenting the compressed portion on the computer as work product for a user. In some embodiments, the work product may be displayed as an outline using at least one outlining format selected from the group consisting of roman numerals, bullet-points, and numbers. In some further embodiments, the work product may be presented aurally, visually, or both.

The computer program product may further include instructions for receiving a plurality of customization rules relating to customizing the display of the work product and instructions for customizing the work product according to one or more of the plurality of customization rules. Additionally, the computer program product may further include instructions for preventing changes to the order of the content of the source data such that the meaning of the content is not altered.

Another aspect includes a computer-implemented method for transforming textual and graphical source data in order to display a work product. The work product may be presented aurally, visually, or both.

These and other aspects of the present invention will be better understood in view of the attached drawings and following detailed description of the invention.

BRIEF DESCRIPTION OF THE DRAWINGS

The patent or application file contains at least one drawing executed in color. Copies of this patent or patent application publication with color drawings will be provided by the Office upon request and payment of the necessary fee.

The features of the present invention which are believed to be novel are set forth with particularity in the appended claims. The present invention, both as to its organization and manner of operation, together with further object and advantages thereof, may best be understood with reference to the following description, taken in connection with the accompanying drawings, which:

FIGS. 3-27 illustrate four exemplary series and their associated views that can be produced by invoking certain compression rules, as follows:

| Figure # | Rule Set | View # |
| --- | --- | --- |
| 3 | 20 | 1 |
| 4 | 22 | 2.0 |
| 5 | 22 | 2.1 |
| 6 | 22 | 2.2 |
| 7 | 22 | 2.3 |
| 8 | 22 | 2.4 |
| 9 | 22 | 2.5 |
| 10 | 22 | 2.6 |
| 11 | 22 | 2.7 |
| 12 | 22 | 2.8 |
| 13 | 22 | 2.9 |
| 14 | 22 | 2.10 |
| 15 | 30 | 3.0 |
| 16 | 30 | 3.1 |
| 17 | 30 | 3.2 |
| 18 | 30 | 3.3 |
| 19 | 30 | 3.4 |
| 20 | 30 | 3.5 |
| 21 | 30 | 3.6 |
| 22 | 40 | 4.0 |

-continued

| Figure # | Rule Set | View # |
| --- | --- | --- |
| 23 | 40 | 4.1 |
| 24 | 40 | 4.2 |
| 25 | 40 | 4.3 |
| 26 | 40 | 4.4 |
| 27 | 40 | 4.5 |

Figure 28:
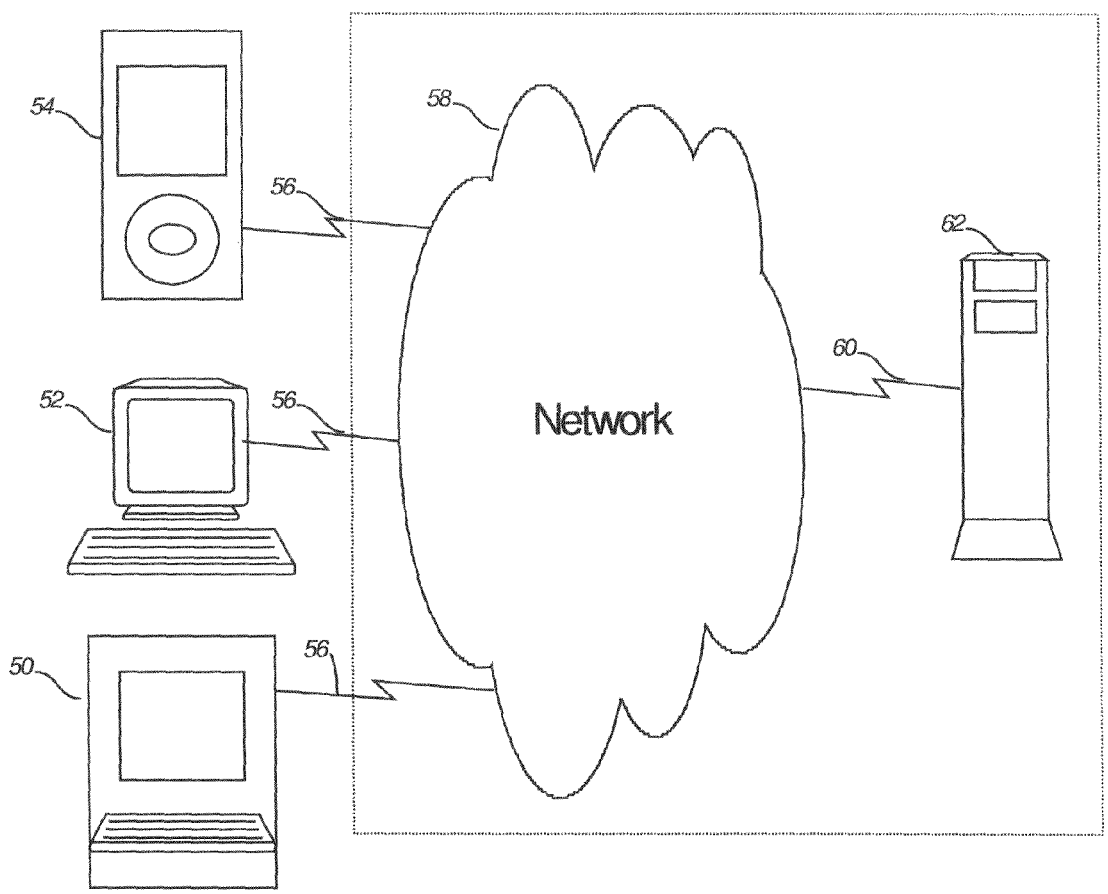

FIG. 28 represents one of the various embodiments of a system for manipulating and displaying textual and graphical information.

DETAILED DESCRIPTION OF THE VARIOUS EMBODIMENT(S)

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

It will be appreciated that by practicing the disclosed method and system, in one or more embodiments, the gist of an entire document may be displayed on one or a few screens, with surplusage (as determined by the reader) omitted, thereby displaying only what appears to be important to the reader. Once a user reads the text on a display device and determines what he/she wants to highlight, a user may receive several different levels of information automatically devoid of surplusage. The levels may be readily available for retrieval and display, depending on how much information the reader needs to see. For example, a user may be an author who selects the highlighted material he feels is important to be initially presented to a reader. This reader may then change the highlighted material according to his preference as he/she reads and becomes familiar with the material.

Figure 1:
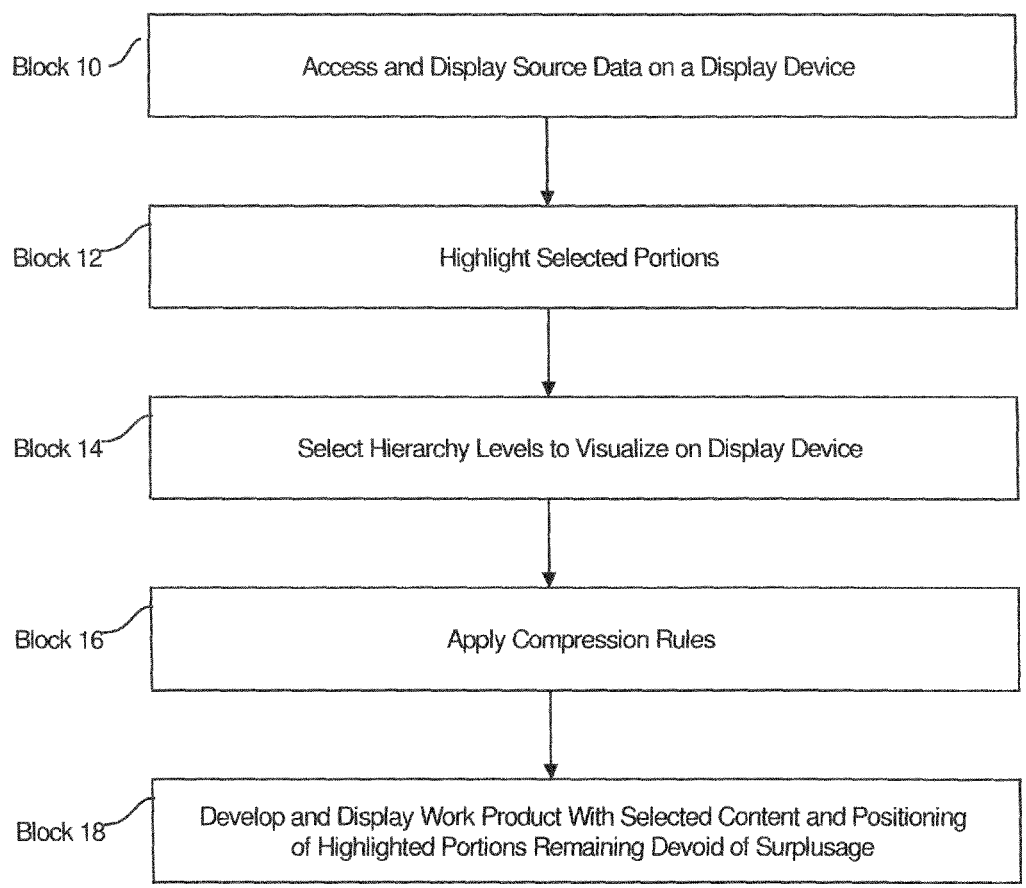
FIG. 1 is a high level flow chart that illustrates some of the steps followed, in a non-limiting sequence, in practicing one embodiment of the disclosed system and method.

Turning first to FIG. 1, an exemplary illustration of the operation of one or more embodiments of the present invention is provided. In one embodiment, a user may load or download software for condensing textual and/or graphical source data to a display device or the software may be pre-installed in the device. The software may include instructions or rules relating to content manipulation of source data. These rules will be further described below.

In another embodiment, a user may receive source data and condense the source data stored on a remote server via a network connection with the remote server. For example, a user may log on to a web server (i.e. website) via the Internet. Additionally or alternatively, a user may access a private server through a private network connection (e.g. LAN or Intranet).

As represented in block 10, the user may access and display on a display device source data ("text") that is substantially unedited by the user. Source data may include graphical or textual data or both. In one embodiment, textual source data may further include numerical data. While reading (or writing) the text, the user (or author) may "highlight" the portions of that text he chooses according to his or her personal preference as in block 12. In some embodiments, "highlighting" may include, but is not limited to, highlighting (with or without different colors), boldfacing, italicizing, underlining, or any combination thereof.

As used herein, the term "display device" includes, but is not limited to, such devices as a PDA (or Pocket PC), smartphones, and dedicated handheld E book readers. FIG. 28, which represents one of the various embodiments of a system for manipulating and displaying textual and graphical information, includes non-limiting examples of "display devices." The terms "display device" or "computer" may also include laptop and desktop computers, personal media players, microprocessors, chips, control units and other processors that are capable of communicating with a screen influenced by control keys. FIG. 28 will be further described in detail below.

The ability to highlight is available on standard word processing programs such as the MICROSOFT WORD wordprocessing program that is distributed by The Microsoft Corporation. But the invention offers something more. Upon selecting (i.e., highlighting) portions of the source data, the user may condense his or her version of the original text to the selected material only - i.e., stripped of de-selected text (i.e., surplusage) as represented in block 16. Selection, in one approach is made by highlighting. Alternatively, this can be done by underlining, italicizing, and/or coloring (e.g., in yellow).

The user may then choose to display it in any of a number of several automatically developed formats (FIGS. 2A-2C) as in block 18. Nothing prohibits a user from having the ability to select a different format from that provided in a default program by giving him the ability to change the default options. In one embodiment, the user may also select priority or hierarchy levels for the source data as in block 14 ordered according to information that is of greater relevance to the user.

One attribute of the invention lies in its ability to condense text into just the desired text that the reader selects. It gives the reader control of a program which gives him specific selection and compression capabilities. All he sees is a digested version of the source material. This may shorten his study or reading time and perhaps augment his comprehension and retention of the digested material. If desired, the digested work product can be stored on a terminal or a web-based server for later retrieval.

In typical prior art approaches to a program, when given the same input, the program will always produce the same output, regardless of the user. In one or more embodiments of the present invention, however, when compression rules are applied to identical text, the final work product may look entirely different to two different users, depending on their personal, subjective preferences.

Compressing data to a more manageable level with just the important details displayed allows more information to be available on a given screen area. This is especially helpful on display devices on which screen space is limited (e.g., computers, PDAs, and cell phones). As electronic devices become smaller, methods and systems for usefully displaying selected information assume a heightened importance. The selected details are determined at the discretion of each user or author. Each user can determine by his personal preference what he wants displayed and what he wants hidden.

In one embodiment, a user may "toggle" between various displays or views. Thus, once a particular view is generated, a user may still retrieve previous views. For example, after performing one or more steps of the various embodiments of the invention (as will be described below), a user may generate a view as represented in FIG. 6. During the same session or at a later session, if a user desires to view the source data as represented in FIG. 4 or 5, he may do so by selecting, for example, a command button on the user interface. Accordingly, a previous view may then be displayed to the user. Other non-limiting ways of toggling may include making a selection from a drop-down menu, selecting a tab, or clicking on a hyperlink. It should be understood that FIGS. 3-27 are represented in an exemplary order and, therefore, are not limited to this particular ordering.

EXAMPLE

An example of how the first two paragraphs of one type of source data—the Declaration of Independence—could be viewed now follows.

Figure 2A:
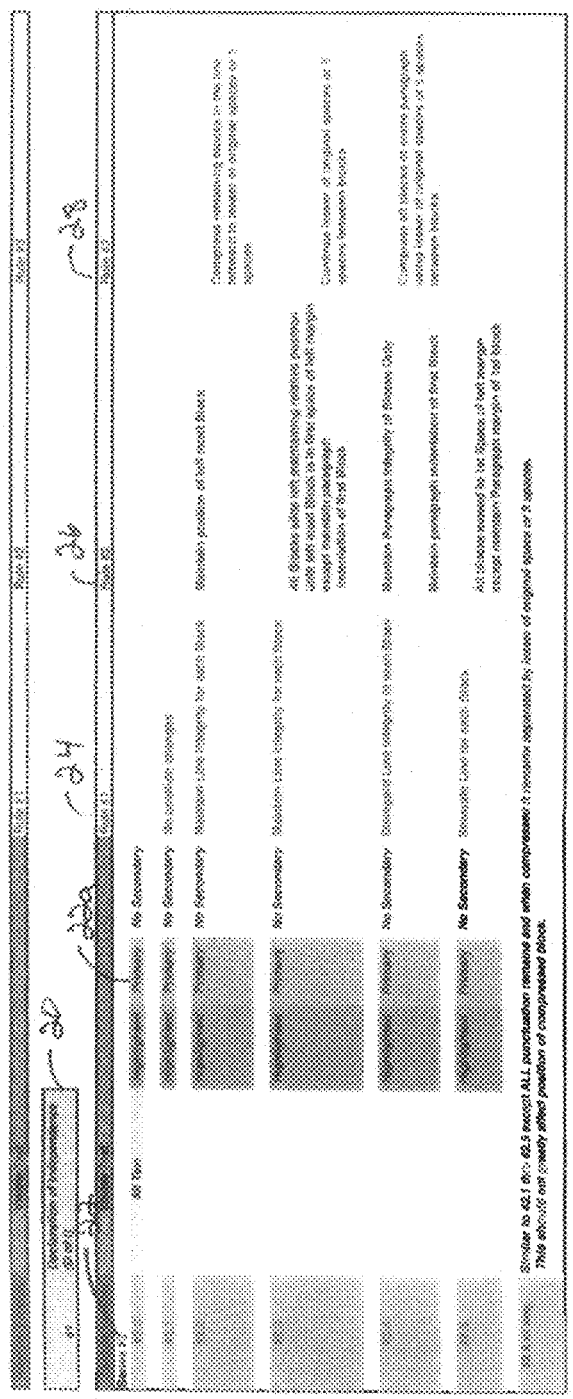
FIGS. 2A, 2B and 2C illustrate exemplary compression rules that can be invoked on a display device by a user of the inventive system and method that may be enabled or practiced on the display device with which a computer software system operates.
Figure 2B:
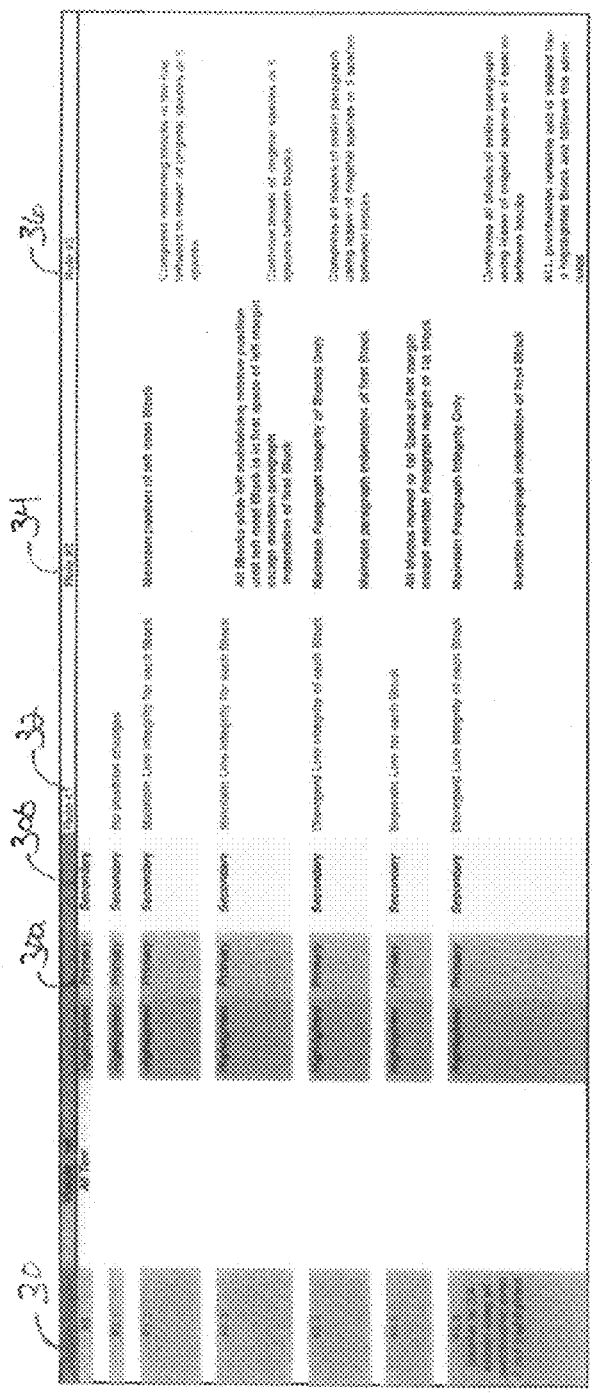
Figure 2C:
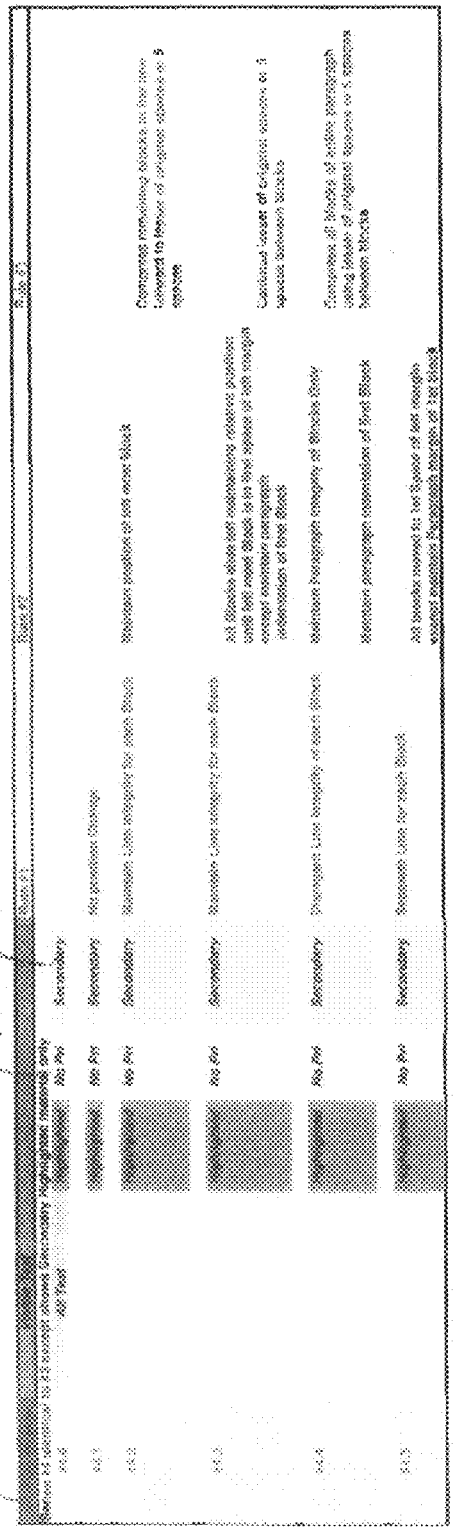
Figure 23:
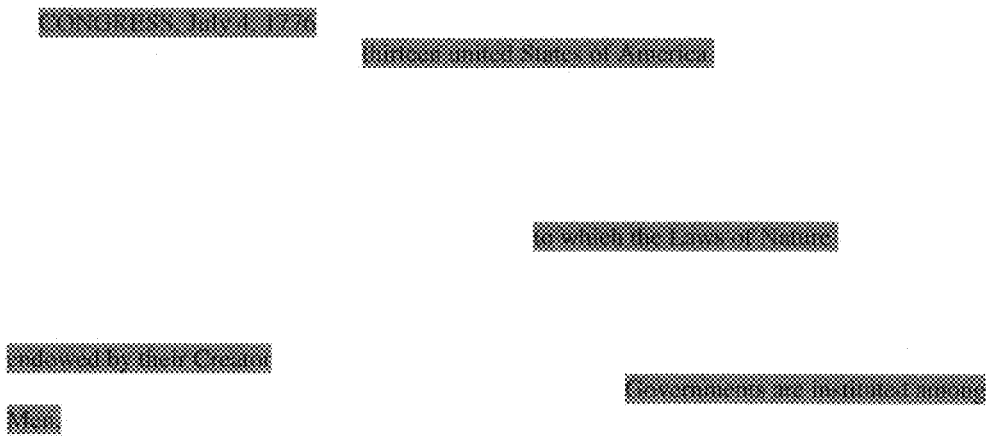
Figure 24:
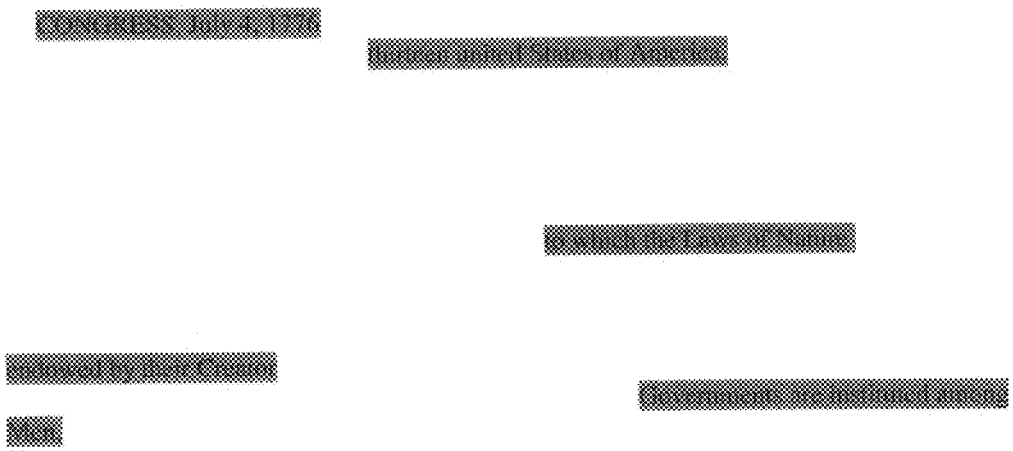
Figure 25:
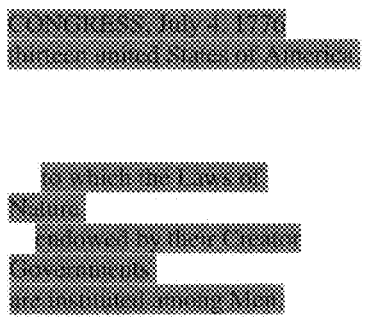
Figure 26:
Figure 27:
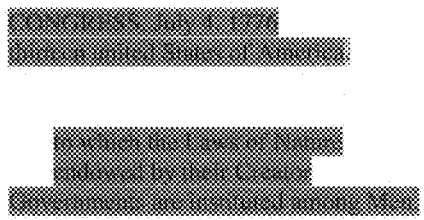

FIGS. 2A-2C illustrate one form of a master list of rules that can be applied in alternative versions of the disclosed method and system. Rule set 20 for example, includes rules for displaying all of the text in a source document.

Rule set 22 may include one or a number of rules relating to content selection (i.e., selection of source data for compression). In one embodiment, the rules include highlighting the content for compression. The highlighted text may or may not be hierarchical. In some embodiments, there may be only a primary level 22a. In other embodiments, there may be at least two levels of highlight available as represented in, for example, rule set 30 (FIG. 2B): primary 30a and secondary 30b. In yet other embodiments, as represented in, for example, rule set 40 (FIG. 2C), there may be at least one rule instructing that there is no primary level 40a, but at least one rule associated with a secondary level 40b.

Information or text that is highlighted may be referred to as "blocks". They are packages of text the user designates to be compressed or manipulated. As noted earlier, in some embodiments, text may be highlighted in different colors, boldfaced, italicized, underlined or "blocked" using any combination thereof. The reader can select any view based on how much information he wants to see. Also, although not demonstrated here, the reader could select and view the text between two highlighted "blocks" by a local expansion. For example, upon performing one or more steps of the various embodiments of the invention as described below, a user may generate a view as represented in FIG. 5. If the user desires to then view the content between selected text (e.g., between "course of human events" and "dissolve the political bonds"), he may do so by "expanding" the text. For instance he may place his mouse indicator/pointer over the non-selected area and the hidden text may re-appear for a predetermined time (e.g., until the user removes the pointer). Other nonlimiting methods of expansion may include selecting an option from a drop-down, menu, and "right-clicking" on the non-selected area to select an option to view the text. It should be understood that FIGS. 4 and 5 are represented in an exemplary order and are not limited to this particular ordering.

As further illustrated in FIGS. 2A and 2B, in one embodiment, there may be at least three alternative rules that can be individually or collectively applied to a series of views to create a number of different views. These rules may generally relate to content compression: one rule may relate to line integrity for each block 24, 32, a second rule may relate to the positioning of blocks 26, 34, and a third rule may relate to various compression alternatives that influence the form of the displayed text (i.e., compression format) 28, 36.

Referring to FIGS. 2A-2C in combination with FIGS. 3 through 27, there are depicted various views that result from the user invoking certain compression rules. The compression rules may be programmed to software (i.e., hard coded). Alternatively or additionally, the compression rules may be received from a server in communication with the display device. In some embodiments, there may only be one level in the hierarchy of highlighted text (FIGS. 2A and 2C). In other embodiments, there may be multiple (e.g., at least 2) levels (FIG. 2B). In some embodiments, a secondary level 30*b*, 40*b* (FIGS. 2B and 2C) may be deemed by the user to be of a lesser level of significance than information designated as primary 22*a*, 30*a*.

FIG. 3 shows a two paragraph, 13 line text in its entirety. FIGS. 4-14 illustrate the compression of the text according to one of the various embodiments of the present invention in which only "primary" content is highlighted (i.e., FIG. 2A).

FIG. 4 shows an example of what the reader has highlighted and may wish to retain. In one embodiment, the logic could be reversed, so that the user may select the "block" to disappear rather than remain. Further manipulation of the text (i.e., of the highlighted source data) may be manually performed via, for example, a button push or command entry at a keyboard or automatically developed. For example, FIG. 5 shows a display of only the highlighted information such that textual material that is not highlighted is removed. In one embodiment, at this stage, nothing is compressed. FIGS. 6 through 9 illustrate four different compression options available, as defined by compression rules 24, 26, 28. The views of the text may be different according to each one of the rules 24, 26, 28 as set by the user or as programmed in the software as represented in FIGS. 6-9. For example, in FIG. 8, the two paragraph, thirteen line text has been condensed to a two paragraph, six line text that is displayed in a limited space that includes only what the reader may determine to be the most important (i.e., it is stripped of surplusage).

FIGS. 10-14 illustrate "primary" views which further include punctuation. The rules applied to embodiments as represented in FIG. 4-9 may be applied in embodiments as represented in FIG. 10-14.

In one embodiment, highlighting can be assigned a priority (e.g. yellow=primary; green=secondary, etc.) and the view of the text can be selected based on primary information, secondary information, or both. FIGS. 15-21 illustrate the selection and manipulation of "primary" and "secondary" source data into a compressed form based on rule set 30. FIGS. 22-27 illustrate the selection and manipulation of "secondary" source data into a compressed form based on rule set 40.

Optionally, an author can condense his source data by selecting the "blocks" before transmission of the text to assist the user. If desired, the user can alter his selection criteria of the "blocks" of text after he views the resulting work product.

Figures, graphs, equations or pictures within the text to be compressed optionally could be selected to remain in the same position in relation to the text or selected to be removed.

It will be appreciated that a screen could be a single view or split view so that a user could toggle back and forth between various available views. If desired, selection markers for the various views could be available on the screen to toggle back and forth between views.

In use, the system could be operated using the display device alone, or be executed by a program that could be run from a CD or downloaded onto a personal device, such as a reader, another display device, a cell phone, a laptop or desktop computer. The program could also be web-based for use via the internet from any connected device.

Although the invention is not so restricted, one illustrative version of working code can be written in Visual Basic, although other programming languages could be used. Thus, it will be appreciated that the invention is not limited to execution through Visual Basic.

In one embodiment, a dictionary or thesaurus function may also be accessible through the disclosed method and system. Such functions could be accessed by selecting a given word or phrase for which a definition or an alternative expression is sought. The software may then access, retrieve and display the desired entries from a dictionary or thesaurus database. Optionally, those databases could be resident on the display device or at a central location, such as a server that is accessed by the internet.

In another embodiment of the invention, an option is provided to default the views so that only given parts of speech are displayed, such as nouns or verbs or only nouns and verbs.

In another embodiment, the user may determine whether the data is to be formatted in an outline or bullet-point format. For example, rather then assigning primary or secondary text priority to a "block" by different highlighted colors or different text as demonstrated earlier, another technique may be to apply the familiar standard outline format using Roman numerals, capital letters, numbers, then small-cases letters, etc. The user would assign the "blocks" a Roman numeral, I, II, III, etc., for instance to represent all the sets of primary text. Between each set of primary text the user would assign secondary text as I.A, I.B, I.C, etc. Between the secondary text I.A.1, I.A.2, I.A.3, etc. or I.B.1, I.B.2, I.B.3, etc. could be assigned to represent tertiary level text. The final product may then be displayed as an outline of the original text built by the user. For instance:

I. "Primary text block I"
        A "Secondary text block IA"
            1 "Tertiary text block IA1"
            2 "Tertiary text block IA2"
            3 "Tertiary text block IA3"
        B "Secondary text block 1B"
            1 "Tertiary text block IB1"
            2 "Tertiary text block IB2"
            3 "Tertiary text block IB3"
        C "Secondary text block IC"
    II "Primary text block II"

This outline could also be viewed as with the other examples by showing only Roman numeral data or only Roman numeral data and capital letter data, for example.

Identical compression as described earlier is also possible. For example, all of the I, I.A, I.A.1, I.A.2, and I.A.3 lines may be on separate lines as shown above or they may be compressed on as few lines as possible (e.g., five spaces apart).

In one embodiment, the system may be defaulted to preclude the order of any "block" from being changed from the order in the original text. Therefore, for instance, text at the end of an article could not be assigned a Roman numeral I and earlier text could not be assigned a II. If enabled, this attempted resequencing could alter the meaning of the text. In other embodiments, this default may be disabled at the discretion of the user if they desire to rearrange information in a manner more meaningful to them.

After the user applies the various compression rules that are provided, a work product may be created as in block 18 (FIG. 1) that may be stored either on a display device, a handheld or desktop device, or at a central location, such as on a server to which access is provided wirelessly or through a cable.

In one aspect of the invention, where the source document may be a text or a treatise that has various chapters and indexes, the invention may usefully display an index to the indexes, or the chapter or sub-chapter headings only.

It will also be appreciated that other embodiments of the invention are also considered to lie within its scope. For example, the disclosure thus far has focused primarily on written textual material. It should be understood that such material includes, but is not limited to, words, numbers, graphical information and other readable indicia. It will be appreciated that the format of incoming, unprocessed data, is not limited to a particular format (e.g., MICROSOFT WORD word-processing program format), and that other formats also lie within the scope of one or more embodiments of the invention. Non-limiting examples may include .WPD, .JPG, .GIF, .BMP, .PNG, TXT, .PDF, .RTF, and other formats.

In one embodiment, after the source data has been processed (as described above), the work product thereby created may optionally be displayed either visually or aurally. FIG. 28 represents various embodiments of "display devices" for presenting a work product to a user. In the case where the work product is "displayed" aurally, the work product may then be accessed by a headset, an earpiece, or another listening device, which may be integral with, or connected to a processor, either wirelessly or through a control unit or a cable.

As represented in FIG. 28, the display device may include a high-resolution screen on which a sharp image appears that, in one embodiment, may be read and look like real paper. There may be various display devices on which to present the work product. They may include, but are not limited to, a smartphone or PDA 50, a desktop or laptop computer 52 and/or a personal media player 54. It should be understood that devices 50, 52, 54 are merely illustrative and various other display devices may be used. Furthermore, one or more display devices, alone or in combination, may also be used for viewing work product.

Furthermore, the device may be used in a stand alone mode in which it is not connected to a computer, thereby dispensing with the need for cables, or a wireless connection. In one embodiment, the display device may or may not synchronize with a central processing unit (not shown) through wired or wireless connection 56. In one embodiment, wireless connectivity may enable the reader to communicate through a network 58 (e.g., internet or intranet) via communication link 60 with a server 62 to provide maximum mobility (e.g., regardless of whether the user is in a motor vehicle, on a couch, in bed, or at an airport). Communication link 60 may be wired or wireless link communication over a network connection (e.g., broadband or dial-up). In some embodiments, the user may have a source document or text delivered wirelessly to the reader (e.g., from server 62).

In one embodiment, the reader is lighter and thinner than a typical bound book, and yet may hold a number of different works from which the user may choose or to which the user may wish to refer. The reader may have an extended battery life that can be recharged if desired in a wireless mode. To avoid the need to locate a hot spot, the reader may, in one embodiment, may use an EVDO high speed data network or its equivalent, as might an advanced cell phone.

In one embodiment, an optional SD memory card may be used with the reader, thereby enabling the user to access and retrieve a greater number of source documents. In an alternate embodiment, controls may be provided on multiple edges of the reader to allow vertical page-turning that permits the user to turn and read pages comfortably, regardless of the user's physical position. Multi-sided navigation enables one-handed controls to be exercised by both the right-handed and left-handed user.

Optionally, orientation controls may be provided to enable the source document or work product to be displayed in a landscape or portrait mode.

In one embodiment, a number of input means may be in communication with at least one computer. The input means may be used to highlight the content of the source data. Non-limiting examples of input means may include mouses, keyboards in a QWERTY format, speech recognition software, electronic pens, stylus, and touch screens.

Among the features provided by software that is either resident in or accessible by the display device, keyboard controls may enable the user to annotate the text, similarly to the act of writing in the margins of a book. Other optional features may enable the user to edit, delete or export such notes, highlights and clip key passages, plus book marking pages for future use. In one embodiment, when the reader is opened, it may reverts to the last page read.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for transforming source data in order to display a work product, the system comprising at least one computer configured to:
    enable a human user to select at least one rule relating to content compression;
    display source data on a display for the user to view;
    enable the user to select from the display at least a portion of the source data less than all of the source data to form a selected portion of the source data and an unselected portion of the source data with the selected portion of the source data having some of the source data and the unselected portion of the source data having the remaining source data;
    compress the selected portion of the source data, with the unselected portion of the source data removed therefrom, according to the at least one rule relating to content compression to form a compressed portion, wherein the at least one rule relating to content compression includes at least one rule relating to an integrity, a position, or a compression format; and
    display the compressed portion on the display in lieu of the source data for the user to view, the compressed portion being the work product.

2. The system of claim 1 wherein the at least one computer is further configured to:
    enable the user to select at least two rules relating to content selection,
    the at least two rules relating to content selection including
    a first rule for selecting primary content and
    a second rule for selecting secondary content.

3. The system of claim 1 wherein the at least one computer is further configured to:
    receive a plurality of customization rules relating to customizing the display of the work product; and
    customize the work product according to one or more of the plurality of customization rules.

4. The system of claim 1 wherein
    the display is of at least one device selected from the group consisting of personal digital assistants (PDAs), smartphones, cellphones, mobile devices, personal media players, and e-book readers.

5. The system of claim 1 further comprising
    a database in communication with the at least one computer so that the at least one computer may retrieve reference information from the database for inclusion in the work product.

6. The system of claim 1 wherein
    the at least one computer is further configured to present the work product aurally, visually, or both.

7. A computer readable storage medium comprising computer readable program code embodied therein, the computer readable program code when executed by a computer performs a method for transforming source data in order to display a work product, the method comprising:

- enabling a human user to select at least one rule relating to content compression;
- displaying the source data on a display for the user to view;
- enabling the user to select from the display at least a portion of the source data less than all of the source data to form a selected portion of the source data and an unselected portion of the source data with the selected portion of the source data having some of the source data and the unselected portion of the source data having the remaining source data;
- compressing the selected portion of the source data, with the unselected portion of the source data removed therefrom, according to the at least one rule relating to content compression to form a compressed portion, wherein the at least one rule relating to content compression includes at least one rule relating to an integrity, a position, or a compression format; and
- displaying the compressed portion on the display in lieu of the source data for the user to view, the compressed portion being the work product.

8. The computer program product of claim 7, wherein the method further comprises:

- enabling the user to select at least two rules relating to content selection, the at least two rules relating to content selection including
- a first rule for selecting primary content and
- a second rule for selecting secondary content.

9. The computer program product of claim 7, wherein the method further comprises:

- receiving a plurality of customization rules relating to customizing the display of the work product; and
- customizing the work product according to one or more of the plurality of customization rules.

10. The computer program product of claim 7 wherein the selected portion is selected by highlighting, boldfacing, underlining, italicizing, or any combination thereof.

11. The computer program product of claim 7 wherein the work product is displayed as an outline using at least one outlining format selected from the group consisting of roman numerals, bullet-points, and numbers.

12. The computer program product of claim 7, wherein the method further comprises preventing changes to the order of the content of the source data.

13. The computer program product of claim 7, wherein the method further comprises presenting the work product aurally, visually, or both.

* * * * *